United States Patent [19]
Turtle

[11] 3,916,180
[45] Oct. 28, 1975

[54] ANALOG MATHEMATICAL ROOT EXTRACTOR

[75] Inventor: Quentin C. Turtle, Cranston, R.I.

[73] Assignee: General Signal Corporation, New York, N.Y.

[22] Filed: June 21, 1974

[21] Appl. No.: 481,742

[52] U.S. Cl. .............. 235/193.5; 235/183; 328/144
[51] Int. Cl.² ............................................. G06G 7/20
[58] Field of Search ................. 235/193, 193.5, 183; 328/144, 127; 307/229, 230

[56] References Cited
UNITED STATES PATENTS

| | | | |
|---|---|---|---|
| 2,605,962 | 8/1952 | Berger | 235/193.5 |
| 3,328,569 | 6/1967 | Brewster | 235/193 |
| 3,488,482 | 1/1970 | Ley | 235/193.5 X |
| 3,564,407 | 2/1971 | Metcalf et al. | 328/144 X |
| 3,652,945 | 3/1972 | Nakane et al. | 328/144 X |
| 3,795,868 | 3/1974 | Ohme et al. | 328/144 |

*Primary Examiner*—Joseph F. Ruggiero
*Attorney, Agent, or Firm*—Barlow & Barlow

[57] ABSTRACT

An nth-root extracting device, most useful as a square-root extractor, which accepts an input signal and derives therefrom an output signal which is proportional to the root of the input signal. The input signal goes to one input terminal of a summer circuit, the output signal from which passes through an integrating device and then through a feedback loop to another input terminal of the summer. The feedback loop raises the output signal of the integrator to the nth power so that the output signal of the integrator is the nth root of the input signal.

7 Claims, 2 Drawing Figures

ANALOG MATHEMATICAL ROOT EXTRACTOR

BACKGROUND OF THE INVENTION

One of the common forms of square-root extractors or square rooters has been a system in which an operational amplifier operates with rather high gain with a summing point or summer at the amplifier input. In a feedback loop from the amplifier output back to the summer, there is a squarer. This type of square rooter is disclosed in U.S. Pat. No. 2,605,962 to Berger and in U.S. Pat. No. 3,328,569 to Brewster, but it will not optimize the square root function. It can be shown mathematically that the output of this type of device is actually $$-\frac{1}{2K} \pm \sqrt{\frac{1}{4K^2} + v_i}$$

where K is the amplification factor of the operational amplifier and $v_i$ is the voltage input to the summer. It can be seen that even though $K$ is large, there will be an error introduced and that effectively the output is not a true square root.

Summary of the Invention

A square root extractor circuit is provided which will act on an input signal that may be a direct current process signal in either the current or voltage mode. The circuit is preferably arranged so that the input signal is converted to a zero-based voltage signal as the first step thereof before application to one input terminal of a summing circuit. The output signal from the summing circuit (summer) is fed to an input terminal of an integrating amplifier. A feedback loop is provided from the output of the integrating amplifier, which includes a squaring function generator (squarer), the output of which is fed to another input terminal of the summing circuit. In this fashion, an output voltage is derived from the output of the integrating amplifier which is directly proportional to the square root of the input voltage as applied to the summer circuit. The output voltage may be either converted to a current signal or used directly, depending upon the other circuitry to which it is to be applied.

DESCRIPTION OF THE PREFERRED EMBODIMENT

Figure 1:
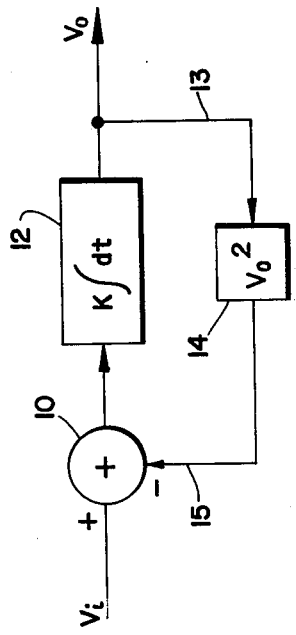
FIG. 1 is a functional block diagram of the square-root extractor of the invention.

Referring to FIG. 1, an input signal voltage $V_i$ is applied to one input terminal (marked +) of a summing circuit or summing point or summer 10. The output signal from an output terminal of the summing circuit leads to an integrating means 12 and a feedback loop is provided via line 13 to a squaring means or squarer 14 and then back to a second input terminal (marked −) of the summing circuit 10 to effectively subtract the squared output value as derived from an idealized squarer from the voltage seen at the first input terminal of summer 10. In order to understand how this circuitry operates, it is preferable to look at this mathematically. For a given input voltage, the output voltage will continue to change until the input to the integrator 12 is zero. This means effectively that the two input signals to the summer are forced to be equal, since the output signal from the squarer 14 is effectively subtracted from the input voltage $V_i$. Accordingly, it can be shown that $V_o^2 = V_i$ or $V_o = \sqrt{V_i}$. Therefore, the circuit forces the output voltage $V_o$ to be exactly proportional to the square root of the input voltage $V_i$.

It should be noted that idealized integrators and squarers are not always necessary to accurate operation of analog computing devices. Typically, integrator 12 may comprise an operational amplifier with capacitor feeedback, and thus will have an output which is inverted from that which would ordinarily be expected from an idealized integrator. Then, depending upon whether or not squarer 14 is a true (idealized) multiplier, which would always have a positive output regardless of the sign of the input signal, or if it is a function generator following some square law and oblivious to proper polarities, it may or not be necessary to use an analog subtractor as the summer. It is necessary therefore to define summer as being broad enough to encompass both analog adders and analog subtractors. One key is that negative feedback to the summer is essential to proper operation.

Figure 2:
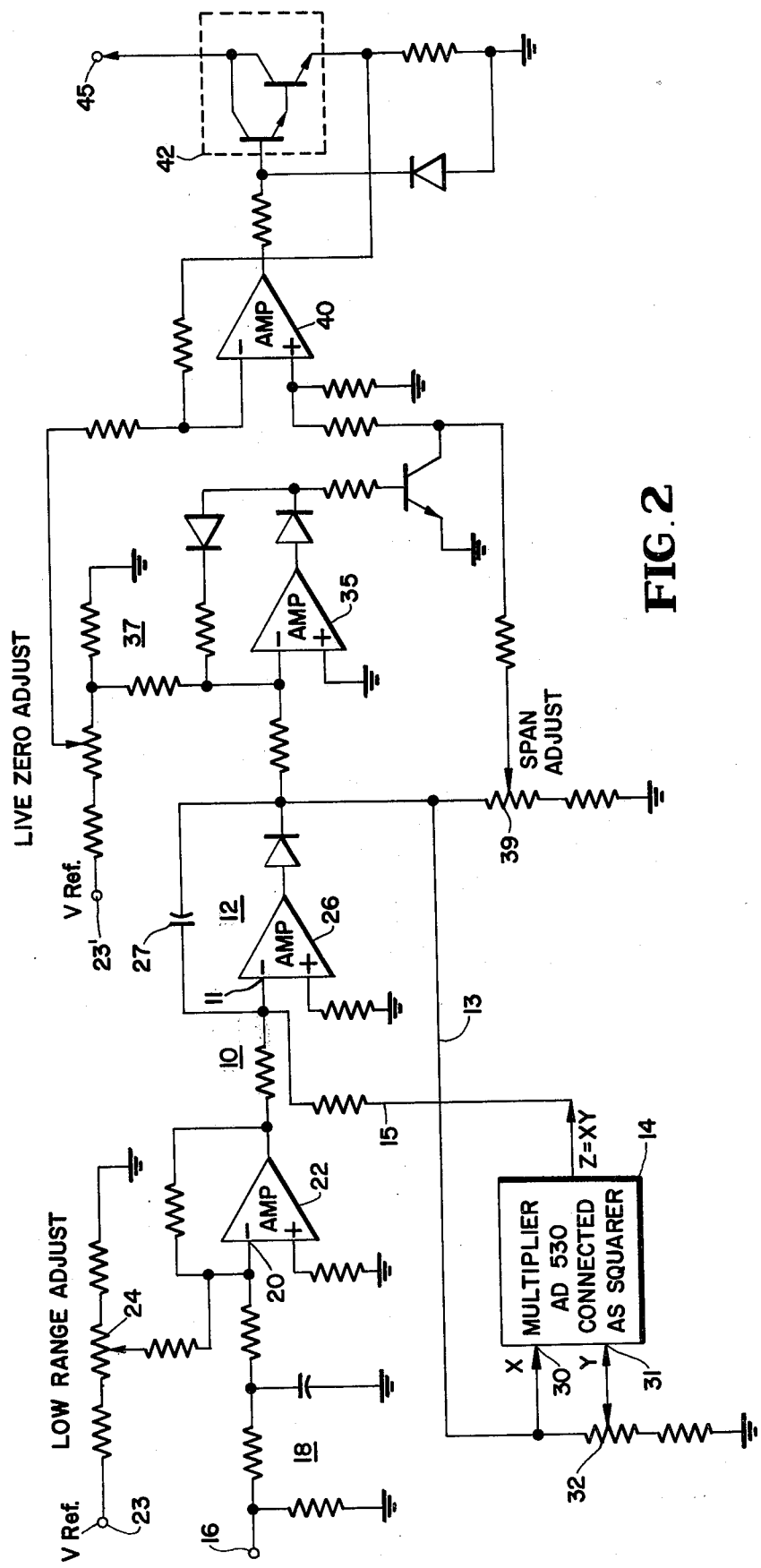
FIG. 2 is a schematic diagram illustrating a preferred embodiment thereof.

Referring now to FIG. 2, a more detailed embodiment of an electronic square rooter according to the invention has been illustrated. Since the input signal in connection with which this embodiment was derived is a process current signal, the signal is applied at the input terminal 16 and converted to a voltage signal by the resistor network 18 as is well known to those skilled in the art, and thence is applied to the input terminal 20 of an amplifier 22. For operational convenience, it is appropriate first to convert the input signal occurring at input terminal 16 to a voltage value. Then, the signal is converted by the network 18 to an effectively zero-biased voltage, thereby forming a signal which is at zero when the input signal is at its lowest level. To achieve this zero conversion, a reference voltage "V Ref" is applied at an input terminal 23, from which an adjustment potentiometer 24 applies it to input 20 of amplifier 22. Adjustment of potentiometer 24 allows the bias value to be zeroed. The output of the amplifier 22 is then fed through a summing network generally indicated at 10 as one component of an input signal to an input 11 of an integrator generally indicated at 12. This integrator comprises an ordinary operational amplifier 26 connected as an integrator by the use of a feedback capacitor 27. The operational amplifier may be of the type manufactured and sold by Analog Devices as their integrated circuit number AD201. The output of this integrator 12 is then fed over lead 13 to a multiplier 14 connected as a squarer. This multiplier may be of the type manufactured and sold by Analog Devices as their integrated circuit number AD530. The output of the squarer is then fed back over lead 15 to another input terminal of summer 10 where it is additively combined with the voltage appearing at the output of amplifier 22 and the signal from the feedback capacitor 27. This combination is then fed to the input of operational amplifier 26. It should be noted that the output of amplifier 22 is the negative of the signal at 16, and since the signal polarity is also reversed going through the integrator 12, the net result is best seen by the following:

$$E_o = K \int_{-\infty}^{t} (E_i - E_2 - E_3) dt$$

where
  $E_o$ = voltage output of integrator 12
  $E_i$ = voltage at input 16

$E_2$ = live zero voltage from potentiometer 24
$E_5$ = voltage output of multiplier 14

In a squarer using multiplier AD530, there are two input terminals to the multiplier device 14, namely an input terminal 30 and an input terminal 31. Each of these two input terminals is connected in an AD530 device to one input of a differential amplifier (not illustrated). The product of the two inputs is formed in a multiplier section within the squarer which uses Gilbert's linearized transconductance technique. Offset voltages may be deduced since the output is fed by an operational amplifier to produce a low impedance output. In effect, a potentiometer 32 at input 31 is used to adjust the squaring function so that a true squaring function is produced. That is to say, since a squaring function is effectively a parabola, the curve is suitably adjusted to produce that result.

In order to make the device practical, it is necessary to provide for a live zero signal at the output. For this purpose, an amplifier 35 and an associated resistive input network 37 having a voltage divider associated therewith fed from a voltage reference input 23' are used to resupply an adjusted reference voltage to the main signal. In effect, therefore, this system acts as an additional summing network. Thus, a live zero voltage is added at the input and amplifier 35. An amplifier 40 is fed by amplifier 35 and acts as a driver for a Darlington circuit indicated generally at 42. The Darlington circuit takes the voltage that has been processed through the device and converts it to a current so that a corresponding current proportional to the square root value appears at the output terminal 45.

From a practical standpoint, it is also necessary to have a span adjustment or range adjustment for the output signal. For example, if the range of the input signal amounted to say 15 milliamps, or there were some other cause for the output to have an incorrect span, then there must be some provision made for adjusting the output span to the desired span. To achieve this a span adjusting pot 39 is provided which, acting in conjunction with amplifier 40, will achieve this result.

Of course, the invention is not limited to square roots, but may be extended as appropriate to the nth root (as cube root, etc.) by substituting for squarer 14 a device for raising its input to the nth power, (as a cuber, etc.). $n$ need not necessarily be an integer, and could for example be two-fifths. One way of achieving this particular power, as understood to those skilled in the art, is to employ for Multiplier 14, a Logrithmic Operational Amplifier.

I claim:

1. A square root extractor adapted to accept an input signal and produce an output signal which is the square root thereof comprising:
    A. a first means for altering a signal in proportion to the integral of the same,
    B. a second means for altering a signal in proportion to the square of the same, the output of the first means being connected to the input of the second means,
    C. third means for subtracting the output of the second means from the input signal to generate a second signal and for coupling the second signal to the input of the first means,
    whereby the output signal from the first means is the square root of the input signal.

2. An extractor as in claim 1 wherein the output of the second means is modified by the factor $1/n$ and whereby the output of the first means is multiplied by an additional factor.

3. An extractor as in claim 1 including means for generating a reference signal and impressing the reference signal on the third means, the third means subtracting the reference signal from the input signal to produce a zero-biased input signal.

4. An nth root extractor comprising
    A. integrator means responsive to a summer-combined signal for generating an integral signal proportional in magnitude to the time-integral of the summer-combined signal,
    B. power raising means responsive to the integral signal for generating a $n$th-power signal proportional in magnitude to the $n$th power of the integral signal,
    C. summer means responsive to an input signal and connected to receive the nth-power signal as a negative-feedback input signal for supplying said summer-combined signal as a signal having a magnitude proportional to the difference between on the one hand the input signal and on the other hand the time integral of the summer-combined signal raised to the $n$th power,
    whereby the integral signal is proportional in magnitude to the nth root of the input signal.

5. A root extractor according to claim 4 wherein n is 2 and the extractor is a square root extractor.

6. A root extractor according to claim 4 wherein all of the recited signals are analog signals.

7. An nth root extractor comprising:
    A. integrator means responsive to a summer-combined signal for generating an integral signal proportional in amplitude to the time-integral of the summer-combined signal,
    B. power raising means responsive to the integral signal for generating an nth-power signal proportional in amplitude to the nth power of the integral signal, and
    C. summer means responsive to an input signal and connected to receive the $n$th-power signal as a negative-feedback input signal for supplying said summer-combined signal as a signal having an amplitude proportional to the difference between on the one hand the input signal and on the other hand the time integral of the summer-combined signal raised to the nth power,
    whereby the integral signal is proportional in amplitude to the $n$th root of the input signal.

* * * * *